(12) United States Patent
Barenbrug et al.

(10) Patent No.: US 8,013,873 B2
(45) Date of Patent: Sep. 6, 2011

(54) DEPTH PERCEPTION

(75) Inventors: Bart Gerard Bernard Barenbrug, Eindhoven (NL); Franciscus Johannes Peters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 963 days.

(21) Appl. No.: 11/911,561

(22) PCT Filed: Apr. 12, 2006

(86) PCT No.: PCT/IB2006/051140
§ 371 (c)(1),
(2), (4) Date: Oct. 15, 2007

(87) PCT Pub. No.: WO2006/111893
PCT Pub. Date: Oct. 26, 2006

(65) Prior Publication Data
US 2008/0192067 A1    Aug. 14, 2008

(30) Foreign Application Priority Data

Apr. 19, 2005    (EP) ..................................... 05103121

(51) Int. Cl.
*G09G 5/02*    (2006.01)
(52) U.S. Cl. ....................................................... 345/629
(58) Field of Classification Search .................... 345/629
See application file for complete search history.

(56) References Cited

U.S. PATENT DOCUMENTS

| | | | | |
|---|---|---|---|---|
| 5,297,217 A | * | 3/1994 | Hamilton et al. | 382/296 |
| 5,499,327 A | * | 3/1996 | Satoh | 345/634 |
| 5,565,907 A | * | 10/1996 | Wada et al. | 347/251 |
| 6,064,424 A | | 5/2000 | Van Berkel et al. | |
| 6,108,014 A | * | 8/2000 | Dye | 345/544 |
| 6,185,042 B1 | | 2/2001 | Lomb et al. | |
| 6,208,354 B1 | * | 3/2001 | Porter | 345/634 |
| 6,356,269 B1 | * | 3/2002 | Nakatsuka et al. | 345/505 |
| 6,693,634 B1 | * | 2/2004 | Mitsushita | 345/428 |

(Continued)

FOREIGN PATENT DOCUMENTS

EP    2004274125 A    9/2004

(Continued)

OTHER PUBLICATIONS

Redert et al: "Synthesis of Multi Viewpoint Images at Non-Intermediate Positions"; Acoustics, Speech, and Signal Processing; IEEE International Conference in Munich, Germany, Apr. 21-24, 1997, IEEE Computer Society, vol. 4, Apr. 21, 1997, pp. 2749-2752, XP010225725.

(Continued)

*Primary Examiner* — Javid A Amini

(57) ABSTRACT

A rendering unit (300) for rendering an output image (102) comprising output pixels, on basis of an input image (100) comprising input pixels and on basis of depth related data elements corresponding to the respective input pixels is disclosed. The rendering unit (300) comprises: a shift computing unit (302) for computing shift values to be applied to the input pixels, on basis of the respective depth related data elements; and an interpolation unit (304) for computing the output pixels on basis of shifting the input pixels with the respective shift values. The shift computing unit (302) is configured to provide an output value as the first one of the shift values, which is substantially equal to zero if the corresponding first one of the input pixels corresponds to overlay, independent of the corresponding depth related data element.

7 Claims, 8 Drawing Sheets

U.S. PATENT DOCUMENTS

Figure 1:
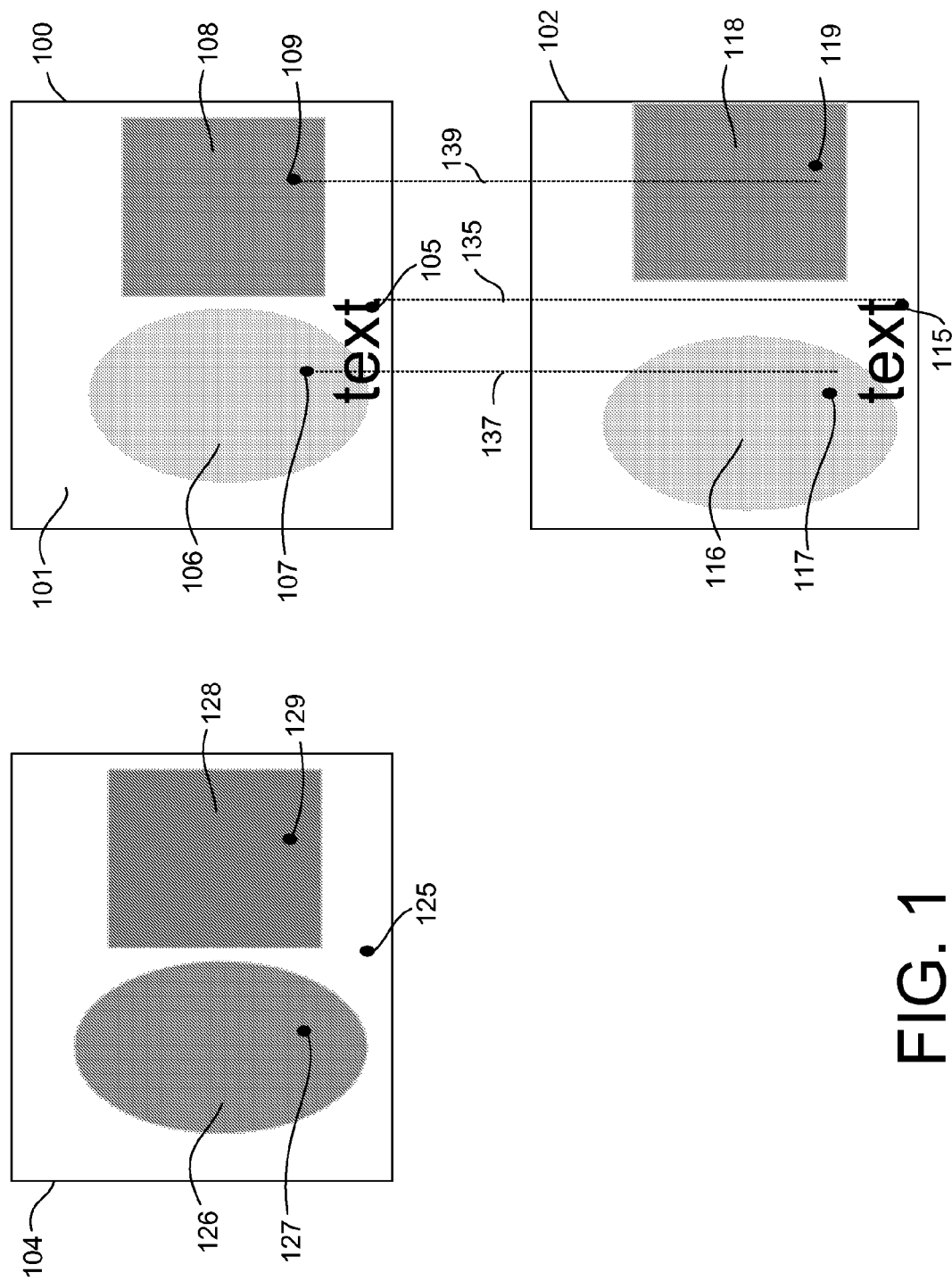

| | | | |
|---|---|---|---|
| 7,227,893 B1 * | 6/2007 | Srinivasa et al. | 375/240.08 |
| 7,321,695 B2 * | 1/2008 | Schwartz | 382/239 |
| 7,634,145 B2 * | 12/2009 | Keith et al. | 382/233 |
| 2002/0003906 A1 * | 1/2002 | Zeng et al. | 382/240 |
| 2002/0186882 A1 * | 12/2002 | Cotman et al. | 382/165 |
| 2002/0196370 A1 | 12/2002 | Dagtas et al. | |
| 2005/0063608 A1 * | 3/2005 | Clarke et al. | 382/284 |
| 2005/0180648 A1 * | 8/2005 | Curry et al. | 382/243 |
| 2006/0061597 A1 * | 3/2006 | Hui | 345/629 |
| 2006/0078180 A1 * | 4/2006 | Berretty et al. | 382/128 |
| 2006/0232598 A1 * | 10/2006 | Barenbrug et al. | 345/582 |
| 2008/0267527 A1 * | 10/2008 | Berretty | 382/276 |

FOREIGN PATENT DOCUMENTS

| | | |
|---|---|---|
| EP | 1489857 A1 | 12/2004 |
| JP | 2002135734 A | 5/2002 |
| JP | 2004104331 A | 4/2004 |
| RU | 2116704 C1 | 7/1998 |
| RU | 2168192 C2 | 5/2001 |
| WO | 96/21171 A2 | 7/1996 |

OTHER PUBLICATIONS

Sullivan, A. "Solid State Multi-Planar Volumetric Display", Proceedings of SID'O3, pp. 1531-1533, 2003.

McAllister, D. Stereo Computer Gaphics and Other True 3-D Technologies, Princeton Universiyt Press, 1993.

Zhang et al: "General and Domain-Specific Techniques for Detecting and Recognizing Superimposed Text in Video"; Proceedings of IEEE ICIP (International Conference on Image Processing, Rochester, NY, Sep. 2002, pp. 593-596.

* cited by examiner

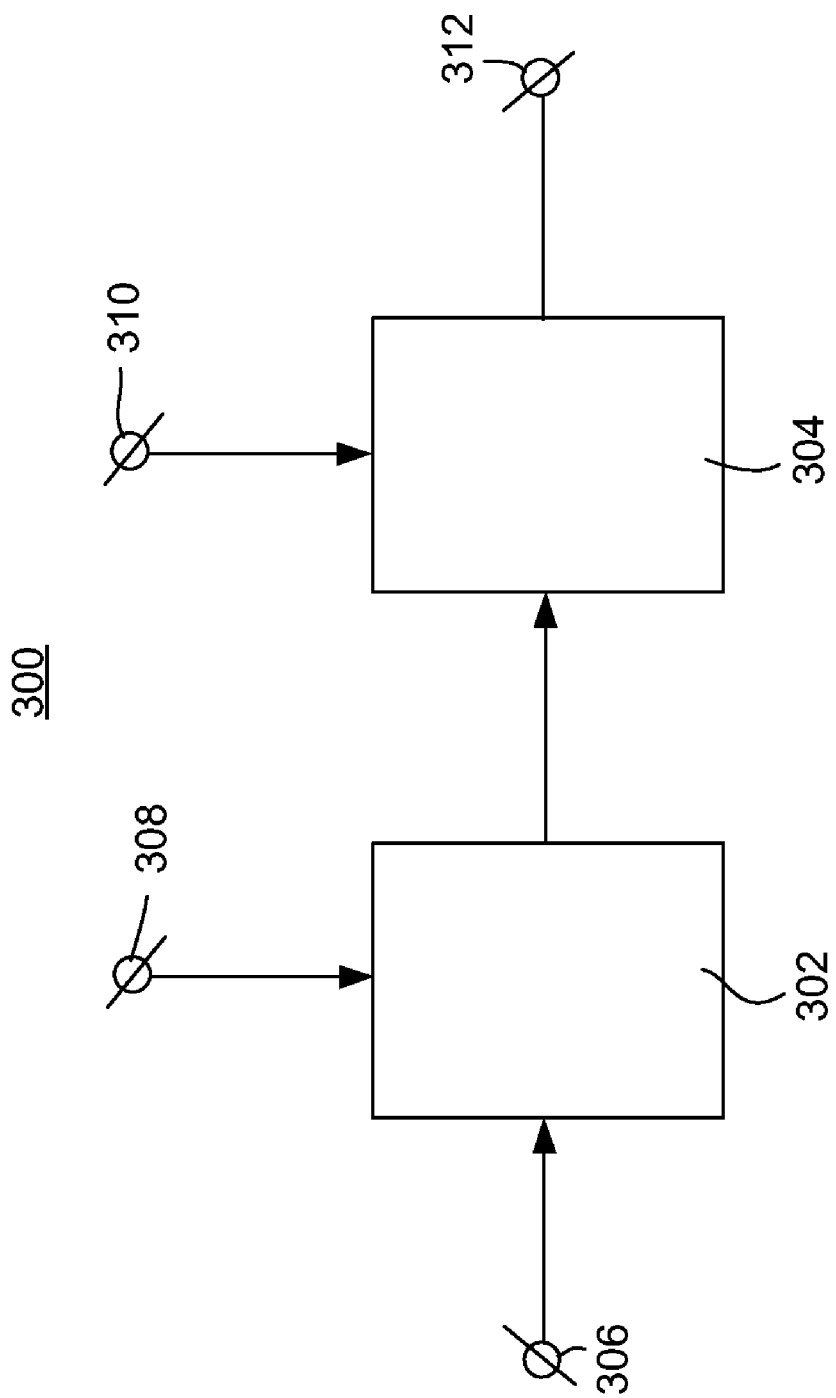

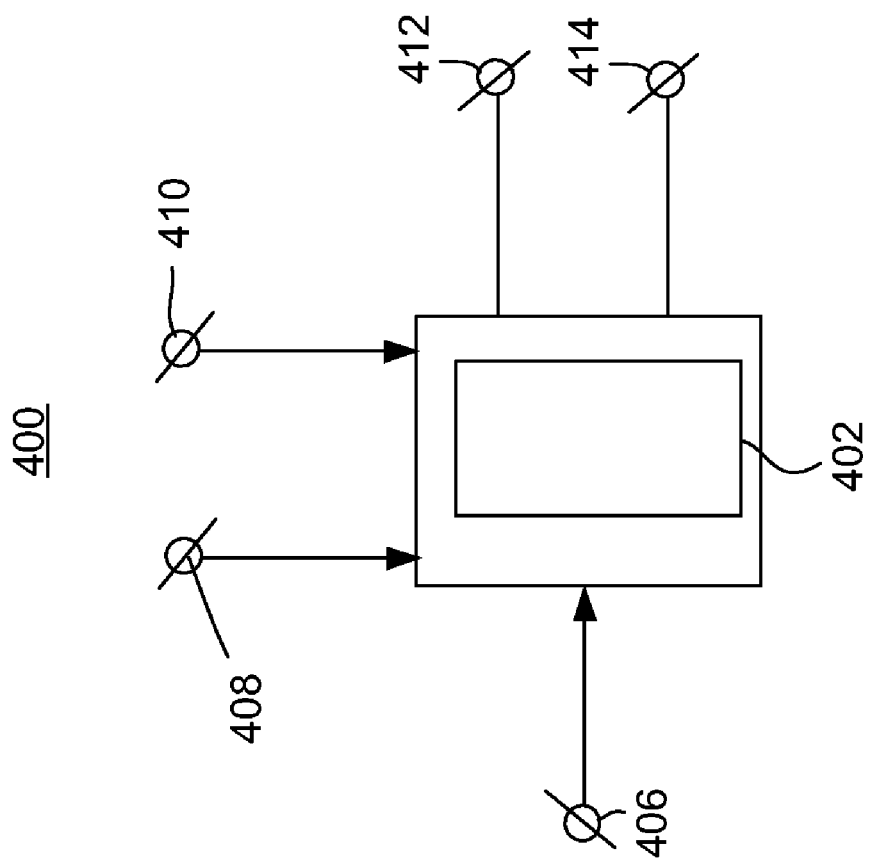

DEPTH PERCEPTION

The invention relates to a rendering unit for rendering an output image comprising output pixels, on basis of an input image comprising input pixels and on basis of depth related data elements corresponding to the respective input pixels, the rendering unit comprising:

a shift computing unit for computing shift values to be applied to the input pixels, on basis of the respective depth related data elements; and an interpolation unit for computing the output pixels on basis of shifting the input pixels with the respective shift values.

The invention further relates to an image processing apparatus, comprising:

receiving means for receiving a signal corresponding to an input image;

such a rendering unit for rendering an output image; and a display device for displaying the output image.

The invention further relates to a computer program product to be loaded by a computer arrangement, comprising instructions to render an output image comprising output pixels, on basis of an input image comprising input pixels and on basis of depth related data elements corresponding to the respective input pixels, the computer arrangement comprising processing means and a memory, the computer program product, after being loaded, providing said processing means with the capability to carry out:

computing shift values to be applied to the input pixels, on basis of the respective depth related data elements; and computing the output pixels on basis of shifting the input pixels with the respective shift values.

The invention further relates to a method of rendering an output image comprising output pixels, on basis of an input image comprising input pixels and on basis of depth related data elements corresponding to the respective input pixels, the method comprising:

computing shift values to be applied to the input pixels, on basis of the respective depth related data elements; and computing the output pixels on basis of shifting the input pixels with the respective shift values.

Since the introduction of display devices, a realistic 3-D display device has been a dream for many. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID'03, 1531-1533, 2003, visual data is displaced at an array of planes by means of a fast projector. Each plane is a switchable diffuser. If the number of planes is sufficiently high the human brain integrates the picture and observes a realistic 3-D object. This principle allows a viewer to look around the object within some extent. In this display device all objects are (semi-) transparent.

Many others try to create a 3-D display device based on binocular disparity only. In these systems the left and right eye of the viewer perceives another image and consequently, the viewer perceives a 3-D image. An overview of these concepts can be found in the book "Stereo Computer Graphics and Other True 3-D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3-D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance United States patents US60064424 and US20000912. In the display devices as disclosed in US60064424 and US20000912 a slanted lenticular is used, whereby the width of the lenticular is larger than two sub-pixels. In this way there are several images next to each other and the viewer has some freedom to move to the left and right.

In order to generate a 3-D impression on a multi-view display device, images from different virtual viewpoints have to be rendered. This requires either multiple input views or some 3-D or depth information to be present. This depth information can be recorded, generated from multi-view camera systems or generated from conventional 2-D video material. For generating depth information from 2-D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The multi-view image is a set of images, to be displayed by a multi-view display device to create a 3-D impression. Typically, the images of the set are created on basis of an input image. Creating one of these images is done by shifting the pixels of the input image with respective amounts of shift. These amounts of shifts are called disparities. So, typically for each pixel there is a corresponding disparity value, together forming a disparity map. Disparity values and depth values are typically inversely related, i.e.:

$$S = \frac{C}{D} \quad (1)$$

with S being disparity, C a constant value and D being depth. Creating a depth map is considered to be equivalent with creating a disparity map. In this specification disparity values and depth values are both covered by the term depth related data elements.

In television, and other applications it is common that text forms an overlay of the image corresponding to the scene. Subtitles and channel logos are prime examples of such overlays. Another example is a graphical representation of a score of a game. These overlays are sometimes available as a separate video stream. In such a case it is preferred to render the video streams separately into multiple views for a multi-view display and to combine, i.e. mix these rendered streams at a late stage. However, in many cases the overlay is not available as a separate video stream, but is integrated into the video, i.e. "burnt in".

A straightforward rendering of a video sequence comprising such a "burnt in" overlay results in output images with relatively low quality of overlay.

It is an object of the invention to provide a rendering unit of the kind described in the opening paragraph, which is arranged to render overlay with a relatively high quality.

This object of the invention is achieved in that the shift computing unit is configured to provide an output value as the first one of the shift values, which is substantially equal to zero if the corresponding first one of the input pixels corresponds to overlay, independent of the corresponding depth related data element. The result of this is that the overlay is put at the depth corresponding to the plane of the screen of the display device, since a shift value, which is substantially equal to zero, corresponds to no or no substantial shift. For visibility, and in particular readability, overlays should be rendered as crisp as possible avoiding the blur which is added by rendering the overlay at a depth other than the depth corresponding to the plane of the screen. Due to crosstalk between multiple views, objects that are relatively far behind the plane of the screen, or relatively far in front of the plane of the screen appear blurry, because several translated versions, i.e. shifted versions, of the objects represented by the input image are mixed. Representations of objects that depth-wise lie in the same plane as the screen are not translated between different output images, so crosstalk does not result in blurriness.

An embodiment of the rendering unit according to the invention comprises an input interface for indicating a first group of pixels of the input pixels which correspond to overlay and a second group of pixels of the input pixels which correspond to non-overlay, the first group of pixels and the second group of pixels forming the input image. That means that external to the rendering unit according to the invention it is detected or determined which of the pixels of the input image corresponds to overlay and which of the pixels of the input image to not correspond to overlay. The information related to overlay/non-overlay is provided to the rendering unit. Preferably, this information is provided by means of an overlay indicator map, which comprises overlay indicators for the respective input pixels of the input image.

An other embodiment of the rendering unit according to the invention comprises a determining unit for determining a first group of pixels of the input pixels which correspond to overlay and a second group of pixels of the input pixels which correspond to non-overlay, the first group of pixels and the second group of pixels forming the input image. That means that the information related to overlay/non-overlay is not externally determined but determined by the rendering unit itself. The overlay indicator map may be computed on basis of the input pixels, e.g. the luminance and/or color values. Additionally or alternatively the depth related data elements are applied to compute the overlay indicators for the respective input pixels.

The fact that overlays are rendered such that they appear at the plane of the screen does not mean that non-overlay pixels are all rendered such that they appear behind the plane of the screen. In fact, the rendering unit according to the invention is arranged to render the output pixels on basis of the respective depth related data elements. For the input pixels for which it has been determined that they belong to overlay an exception to this rule is made, i.e. the corresponding output pixels are computed independent of the corresponding depth related data element. Without additional measures this may result in an occlusion of overlays by non-overlay pixels. To prevent that from happening an embodiment of the rendering unit according to the invention, further comprises:

an overlap establishing unit for establishing, on basis of a portion of the depth related data elements, whether there is an overlap area in the output image to which a first one of the first group of pixels is to be mapped and a first one of the second group of pixels is to be shifted; and a selecting unit for selecting the first one of the first group of pixels for computing a second one of the output pixels situated in the overlap area.

In this embodiment according to the invention, the rendering unit is arranged to establish that there is an overlap area, i.e. an occlusion. That means that the rendering unit is arranged to establish that multiple pixels of mutually different types, i.e. overlay and non-overlay are mapped to the same coordinate of the output image. This embodiment of the rendering unit according to the invention is further configured to let a pixel of the overlay type prevail in the case of overlap.

Besides occlusion, for which preferably additional measures are performed by an embodiment of the rendering unit according to the invention, de-occlusion is preferably also handled appropriately. To prevent that artifacts occur at an empty area, i.e. at a de-occlusion area, an embodiment of the rendering unit according to the invention further comprises:

an empty area establishing unit for establishing, on basis of a further portion of the depth related data elements, whether there is an empty area in the output image to which none of the pixels of the first group of pixels is to be mapped and to which none of the pixels of the second group of pixels is to be shifted; and a selecting unit for selecting a particular one of the second group of pixels for computing a third one of the output pixels situated in the empty area.

Preferably the selecting unit is configured to select the particular one of the second group of pixels in the environment of the empty area. That means that in the case of an empty area the pixels of the overlay do not prevail but instead of that pixels of the non-overlay prevail. Typically, overlays like logos and subtitle text have very definite shapes. Computing pixel values for the pixels in the empty area based on pixel values from the overlay extends the overlay into the empty area. Since overlays typically have definitive shaped, this results in artifacts. Basing the pixel values on the non-overlay pixels, i.e. the second group of pixels, extends the non-overlays into the empty area, which typically does not result in such severe artifacts.

It is a further object of the invention to provide an image processing apparatus of the kind described in the opening paragraph, which is arranged to render overlay with a relatively high quality.

This object of the invention is achieved in that the shift computing unit of the rendering unit of the image processing apparatus is configured to provide an output value as the first one of the shift values, which is substantially equal to zero if the corresponding first one of the input pixels corresponds to overlay, independent of the corresponding depth related data element.

It is a further object of the invention to provide a computer program product of the kind described in the opening paragraph, which is arranged to render overlay with a relatively high quality.

This object of the invention is achieved in that the step of computing shift values results into an output value as the first one of the shift values, which is substantially equal to zero if the corresponding first one of the input pixels corresponds to overlay, independent of the corresponding depth related data element.

It is a further object of the invention to provide a method of the kind described in the opening paragraph, which is arranged to render overlay with a relatively high quality.

This object of the invention is achieved in that the step of computing shift values results into an output value as the first one of the shift values, which is substantially equal to zero if the corresponding first one of the input pixels corresponds to overlay, independent of the corresponding depth related data element.

Modifications of the rendering unit and variations thereof may correspond to modifications and variations thereof of the image processing apparatus, the method and the computer program product, being described.

Figure 2:
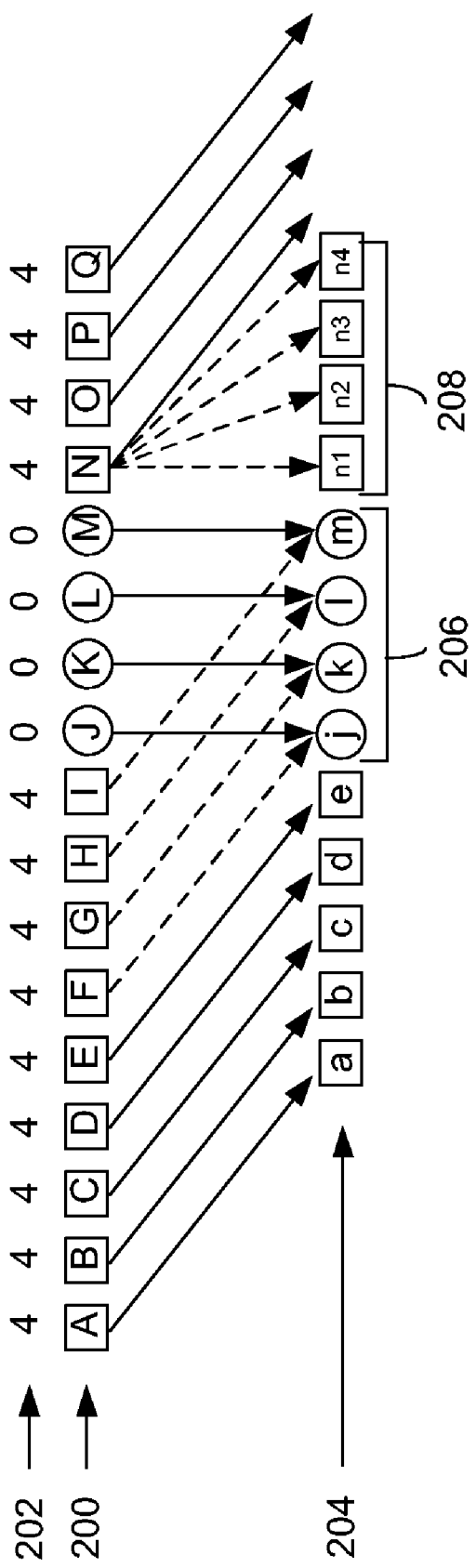
Figure 3B:
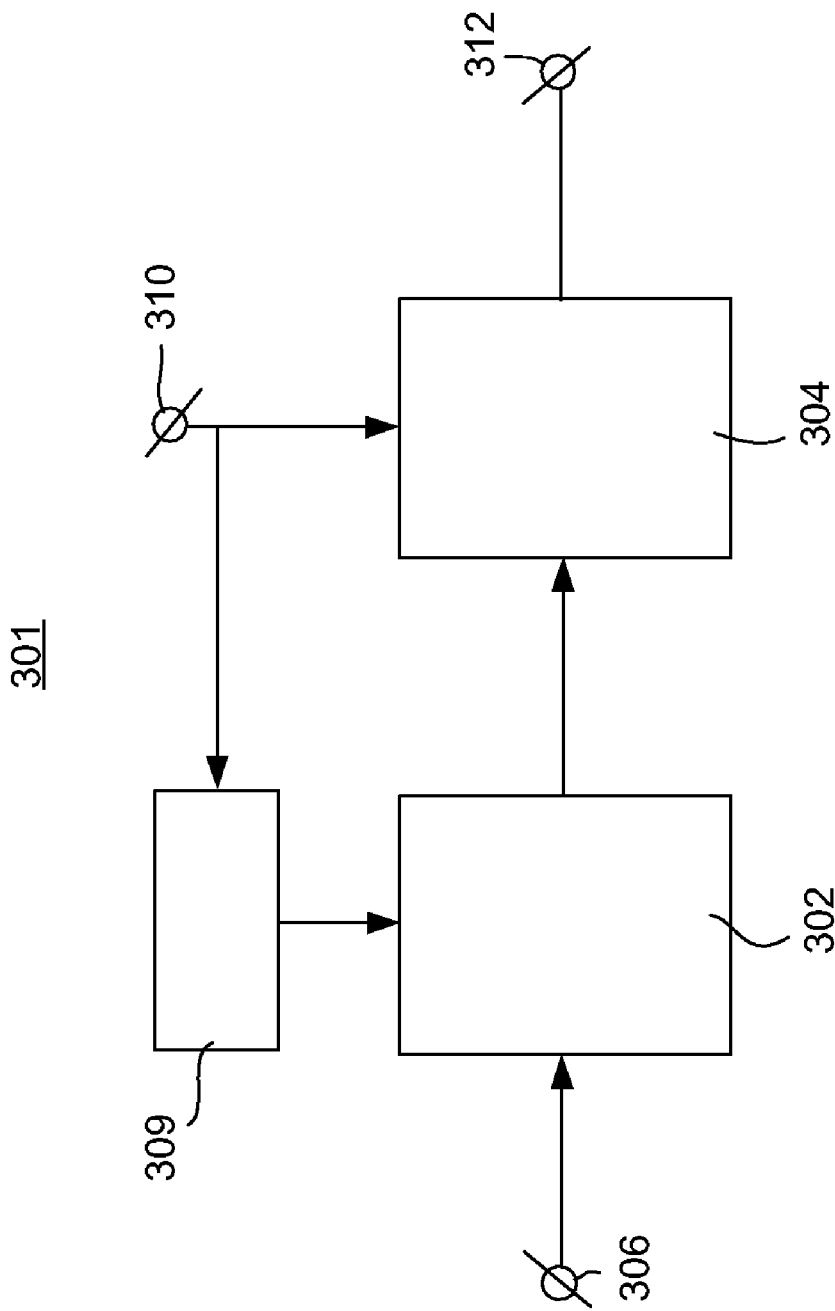
Figure 3C:
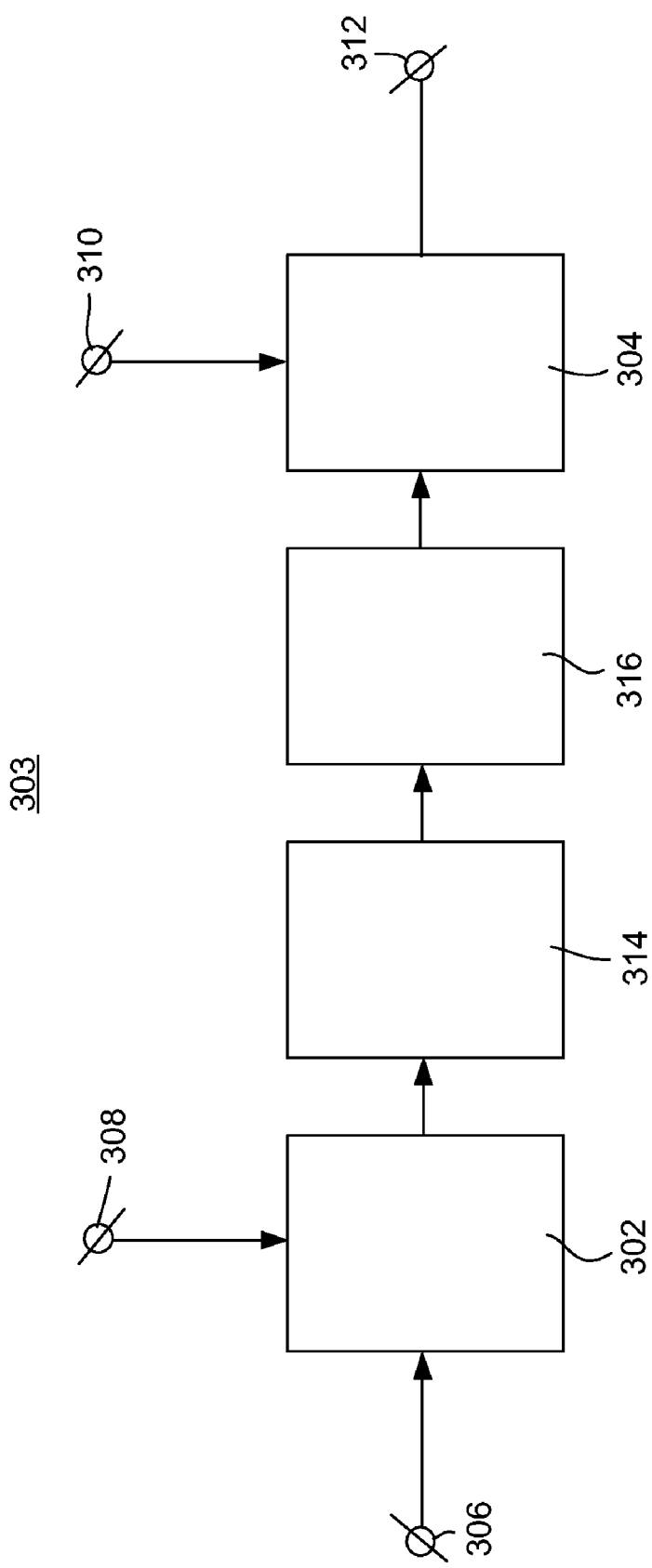
Figure 3D:
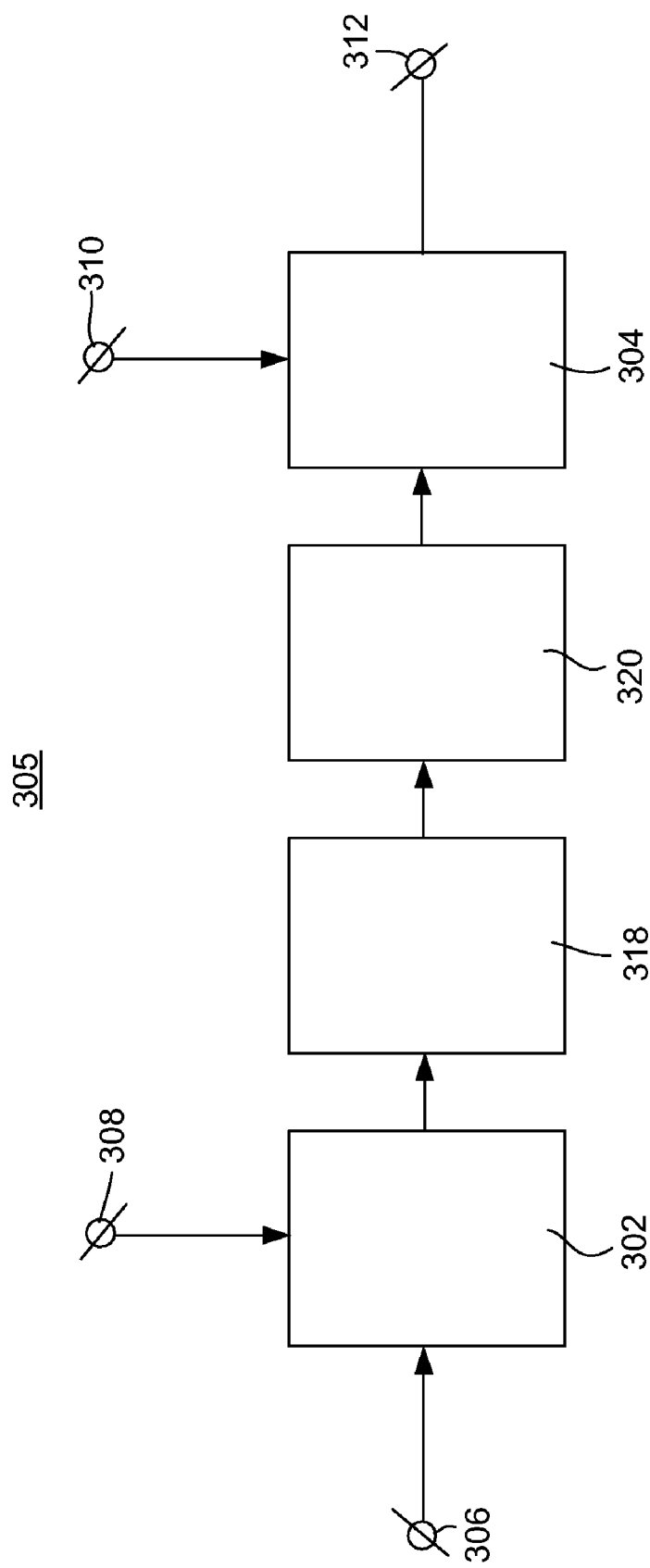
Figure 5:
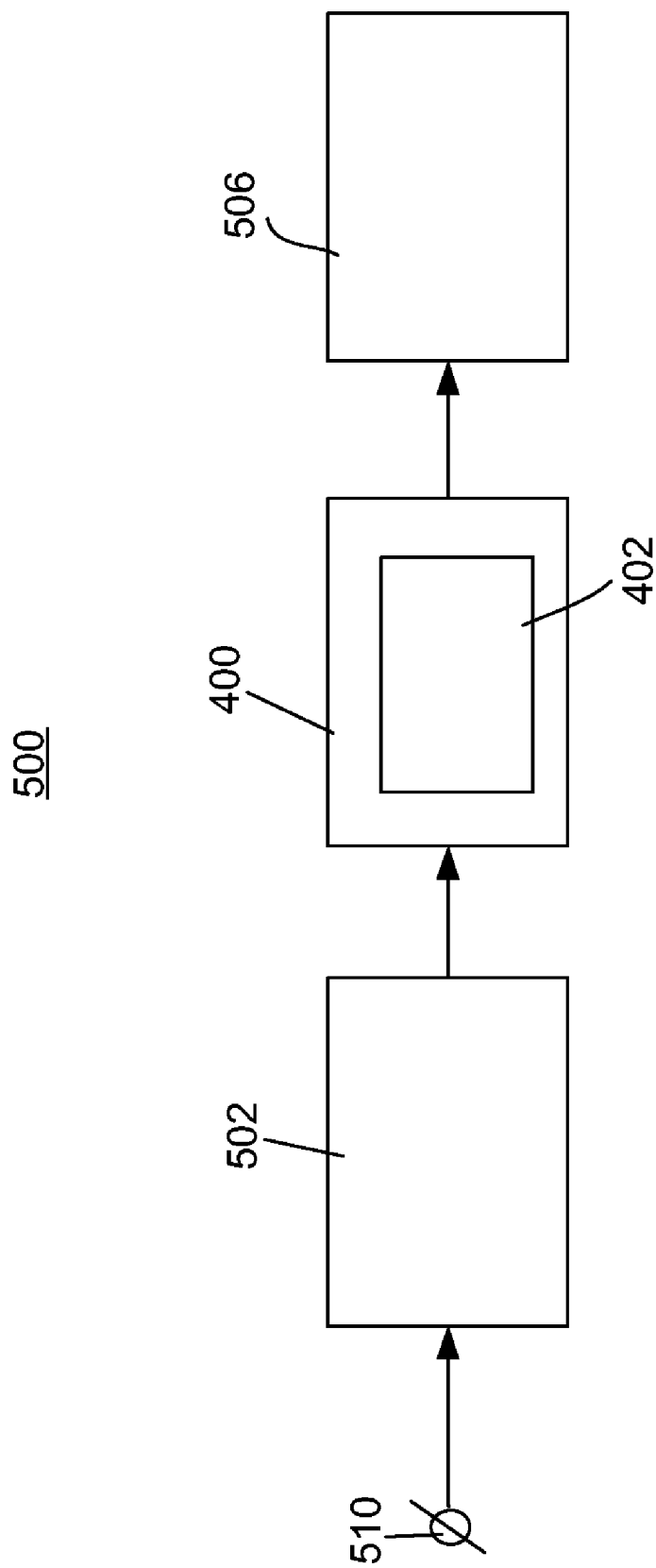

These and other aspects of the rendering unit, of the image processing apparatus, of the method and of the computer program product, according to the invention will become apparent from and will be elucidated with respect to the implementations and embodiments described hereinafter and with reference to the accompanying drawings, wherein:

FIG. 1 schematically shows an input image, the corresponding depth map and an output image;

FIG. 2 schematically shows the mapping of input pixels to output pixels;

FIG. 3A schematically shows an embodiment of the rendering unit according to the invention comprising an input interface for indicating which input pixels corresponds to overlay and which pixels corresponds to non-overlay;

FIG. 3B schematically shows an embodiment of the rendering unit according to the invention comprising an determining unit for determining which input pixels corresponds to overlay and which pixels corresponds to non-overlay;

FIG. 3C schematically shows an embodiment of the rendering unit according to the invention comprising an overlap establishing unit;

FIG. 3D schematically shows an embodiment of the rendering unit according to the invention comprising an empty area establishing unit;

FIG. 4 schematically shows an embodiment of a multi-view image generation unit; and FIG. 5 schematically shows an embodiment of the image processing apparatus according to the invention Same reference numerals are used to denote similar parts throughout the Figures.

FIG. 1 schematically shows an input image 100, the corresponding depth map 104 and an output image 102. The input image 100 comprises a number of input pixels. The input pixels can be categorized in two groups of pixels. The first group of pixels comprises pixels, which corresponds to overlay. The second group of pixels comprises pixels, which corresponds to non-overlay. With overlay is meant a graphical representation like text or an icon. An overlay may correspond to subtitles, to a logo of a broadcast channel but alternatively the overlay corresponds to on-screen display (OSD) information, which is created by a recorder or a player. The overlay may also be related to graphical information corresponding to the score of a game. Non-overlay corresponds to visual information, which is not of the overlay. Typically, non-overlay corresponds to image data, which has been acquired by a camera. Alternative the non-overlay image data has been created by means of a graphics computer, like computer generated movies from "Dreamworks".

Although overlay and non-overlay data are combined in a single input image there is typically no visual relation between them. In other words, the pixel values, i.e. color and/or luminance values of the first group of pixels are typically not related to the pixel values of the second group of pixels. Typically, the overlay occludes a portion of the information being represented by the non-overlay in the input image.

A first one 105 of the first group of pixels of the input image 100 belongs to a character "t" of a subtitle. The input image 100 comprises representations of a first 106 and a second object 108 in front of a background 101. The representation of the first object 106 has an oval shape and comprises a first one 107 of the second group of pixels. The representation of the second object 108 has a rectangular shape and comprises a second one 109 of the second group of pixels.

FIG. 1 further schematically shows a depth map 104. The depth map 104 is a two-dimensional matrix of depth related data elements, i.e. depth values. The number of depth related data elements of the depth map 104 is equal to the number of pixels of the input image 100. The depth values as depicted in FIG. 1 correspond to the respective pixel values of the input image 100. The depth map 104 comprises a first set 126 of depth values which corresponds to the representation of the first object 106 of the input image 100 and a second set 128 of depth values which corresponds to the representation of the second object 108 of the input image 100. A first one 127 of the depth values of the first set 126 of depth values corresponds to a first one 107 of the pixels of the representation of the first object 106 and a second one 129 of the depth values of the second set 128 of depth values corresponds to a first one 109 of the pixels of the representation of the second object 108.

FIG. 1 further schematically shows an output image 102, comprising a further representation of the first object 116 and a further representation of the second object 118. The further representation of the first object 116 is based on the representation of the first object 106 of the input image 100 and the further representation of the second object 118 is based on the representation of the second object 108 of the input image 100. The further representation of the first object 116 is computed by shifting the respective input pixels of the first object 106 of the left. The amount of shift is related to the respective depth values of the first set 126 of depth values. The input image 100 and the output image 102 are depicted aligned in FIG. 1. It can be seen with the first dashed line 137 that the first one 107 of the pixels of the representation of the first object 106 and the corresponding first one 117 of pixels of the further representation of the first object 116 do not have mutually equal coordinates. In other words, the corresponding first one 117 of pixels of the further representation of the first object 116 is computed by shifting the first one 107 of the pixels of the representation of the first object with a shift which is based on the first one 127 of the depth values of the first set 126 of depth values.

Similarly, it can be seen with the second dashed line 139 that the first one 109 of the pixels of the representation of the second object 108 and the corresponding first one 119 of the pixels of the further representation of the second object 118 do not have mutually equal coordinates. In other words, the corresponding first one 119 of the pixels of the further representation of the second object 118 is computed by shifting the first one 109 of the pixels of the representation of the second object with a shift which is based on the first one 129 of the depth values of the second set 128 of depth values.

Having a look at the pixels corresponding to the overlay representing the word "text" shows that no shift has been applied to the input pixels representing that overlay. For instance, the first one 105 of the first group of pixels of the input image 100 belonging to the character "t" and the corresponding output pixel 115 have mutually equal coordinates. The third dashed line 135 clearly indicates that no shift has been applied. In other words, the word "text" in both the input image 100 and the output image 102 is located at the same coordinates. Notice that the depth values corresponding to the first group of pixels, i.e. belonging to the respective input pixels representing the word "text" as available in the depth map 104 are not mutually equal. In fact they are not all equal to zero, resulting in that no shift has to be applied. The reason that the pixels of the first group of pixels are actually not shifted in order to create the output image 102, is to keep a sharp overlay according to the invention.

FIG. 2 schematically shows the mapping of input pixels 200 to output pixels 204. FIG. 2 schematically shows a number of input pixels 200. There is a first group of input pixels which are depicted with circles and which are referenced by capital characters J-M. The first group of input pixels correspond to overlay. There is a second group of input pixels which are depicted with boxes and which are referenced by capital characters A-I,N-Q. The second group of input pixels correspond to non-overlay.

The amounts of shift 202 to be applied to the respective input pixels 200 are indicated with numerical values (4 and 0) above the boxes and circles. The different arrows in FIG. 2 represent the amounts of shift and mappings from in put pixels to output pixels.

FIG. 2 schematically shows a number of output pixels 204. There is a first group of output pixels which are depicted with circles and which are referenced by small characters j-m. There is a second group of output pixels which are depicted with boxes and which are referenced by small characters a-e,n1-n4.

In the output image 204 there is an overlap area 206. It can be seen that a first one J of the first group of input pixels is to be mapped and a first one F of the second group of input pixels is to be shifted to the same location in the output image. The same is true for the following pairs of input pixels: K and G; L and H; M and I. The eventually selected output pixels are labeled with j, k, l and m respectively. That means that the values of the different output pixels are based on the respective values of the first group of input pixels, i.e. the input pixels corresponding to overlay. The embodiment of the rendering unit 303 according to the invention as disclosed in connection with FIG. 3C is arranged to establish that there is an overlap area and to perform the selection of the appropriate input pixels in order to compute the respective output pixels.

In the output image 204 there is an empty area 208. That means that none of the pixels of the first group of pixels is to be mapped and none of the pixels of the second group of pixels is to be shifted to that empty area 208, when taking into account the coordinates of the input pixels and the corresponding amounts of shift. It will be clear that without assigning a value to a particular output pixel a hole or gap exists. Because that is not acceptable additional measures are needed to prevent that from happening. As can be derived from FIG. 2 a pixel value of a particular input pixel N of the second group of pixels is applied to compute pixel values of the output pixels n1-n4, which are located in the empty area. The pixel values of the output pixels n1-n4 are all based on the particular input pixel N which is located relatively close to a border pixel M which is located at the border of an overlay. In the provided example the particular input pixel N corresponds to the input pixel having the minimum distance toward the border pixel M. It will be clear that an other input pixel with a large distance, e.g. the input pixel referenced with O, is selected for the described purpose or multiple pixels, e.g. extrapolate from P-O-N into the empty area). The embodiment of the rendering unit 305 according to the invention as disclosed in connection with FIG. 3D is arranged to establish that there is an empty area 208 and to perform the selection of the appropriate input pixels in order to compute the respective output pixels.

FIG. 3A schematically shows an embodiment of the rendering unit 300 according to the invention. The rendering unit 300 is arranged to render an output image 102 comprising output pixels 115, 117, 119 on basis of an input image 100 comprising input pixels 105, 107, 109 and on basis of depth related data elements 127, 125, 129 corresponding to the respective input pixels 105, 107, 109. The rendering unit 300 comprises:

a shift computing unit 302 for computing shift values to be applied to the input pixels 105, 107, 109 on basis of the respective depth related data elements 127, 125, 129; and an interpolation unit 304 for computing the output pixels 115, 117, 119 on basis of shifting the input pixels 105, 107, 109 with the respective shift values.

The rendering unit 300 further comprises:

a first input connector 308 for providing depth related data elements to the shift computing unit 302;

a second input connector 306 for providing information related to overlay/non-overlay, preferably in the form of an overlap indicator map. The overlap indicator map comprises for each of the input pixels 105, 107, 109 a respective indicator for indicating whether the input pixel corresponds to overlay or to non-overlay; and a third input connector 310 for providing the pixel values of the input pixels 105, 107, 109 to the interpolation unit 304.

The working of the rendering unit 300 is as follows. For each of the provided input pixels 105, 107, 109 the corresponding shifts are computed on basis of the respective depth related data elements 127, 125, 129, by the shift computing unit 302. The computed shifts are provided to the interpolation unit 304, which is arranged to compute the values of the output pixels by actually applying the computed shifts to the respective input pixels. The values of the computed output pixels are provided at the output connector 312.

The rendering unit 300 is arranged to make a distinction between input pixels, which correspond to overlay, and which correspond to non-overlay. That means that for input pixels, which correspond to non-overlay the respective shifts are based on the respective depth related data elements. However, for input pixels which correspond to overlay the respective shifts are equal to zero. That means that the shift computing unit 302 is configured to provide zero as output if the corresponding input pixels corresponds to overlay, independent of the corresponding depth related data element of the input pixels. Optionally, the respective shifts are approximately zero if e.g. for reasons of accuracy a shift of exactly zero would result in artifacts.

The shift computing unit 302 and the interpolation unit 304 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

It should be noted that a particular output pixel might be based on a single input pixel by shifting the single input pixel with a vector having an integer length related to the sampling grid of the input image. However typically, the amount of shift does not have an integer length. In such a case a particular output pixel is based on a weighted average of multiple input pixels whereby the weighting is e.g. based on the fractional part of the amount of shift or another filter function.

FIG. 3B schematically shows an embodiment of the rendering unit 301 according to the invention comprising an determining unit 309 for determining which input pixels corresponds to overlay and which pixels corresponds to non-overlay. This embodiment of the rendering unit 301 is substantially equal to the rendering unit 300 as described in connection with FIG. 3A. The difference is that the information about which of the input pixels corresponds to overlay and which correspond to non-overlay is not externally determined and provided but is determined within the rendering unit 301. Such a determining unit is known for the skilled person e.g. from the article "General and domain-specific techniques for detecting and recognized superimposed text in video", by D. Zhang, R, K. Rajendran, and S-F. Chang, in proceedings of IEEE ICIP (International Conference on Image Processing), Rochester, N.Y., USA, September 2002 or from the article "detection of TV commercials" by Alberto Albiol, Maria Jose Ch. Fulla, Antonio Albiol & Luis Torres, see page 2-3, chapter 2: "logo mask extraction."

The shift computing unit 302, the interpolation unit 304 and the determining unit 309 may be implemented using one processor.

FIG. 3C schematically shows an embodiment of the rendering unit 303 according to the invention comprising an overlap establishing unit 314 and first selecting unit 316. This embodiment of the rendering unit 303 is substantially equal to the rendering unit 300 as described in connection with FIG. 3A. The difference is that the rendering unit 303 according to this embodiment is arranged to let input pixels which correspond to overlay prevail over input pixels which correspond to non-overlay in the case of an overlap area. This embodiment of the rendering unit 303 comprises:

an overlap establishing unit 314 for establishing, on basis of a portion of the depth related data elements, whether there is an overlap area in the output image to which a first one J of the first group of pixels is to be mapped and a first one F of the second group of pixels is to be shifted; and a first selecting unit 316 for selecting the first one J of the first group of pixels for computing a second one j of the output pixels situated in the overlap area 206.

The working and the advantage of this establishing and selection are explained in connection with FIG. 2.

Alternatively, the rendering unit 303 also comprises the determining unit 309 as explained in connection with FIG. 3B.

The shift computing unit 302, the interpolation unit 304, the determining unit 309, the overlap establishing unit 314 and the first selecting unit 316 may be implemented using one processor.

FIG. 3D schematically shows an embodiment of the rendering unit 305 according to the invention comprising an empty area establishing unit 318 and corresponding selecting unit 320. This embodiment of the rendering unit 305 is substantially equal to the rendering unit 300 as described in connection with FIG. 3A. The difference is that the rendering unit 305 according to this embodiment is arranged to let input pixels which correspond to non-overlay prevail over input pixels which correspond to overlay in the case of an empty area 208. This embodiment of the rendering unit 305 comprises:

an empty area establishing unit 318 for establishing, on basis of a further portion of the depth related data elements, whether there is an empty area 208 in the output image to which none of the pixels of the first group of pixels is to be mapped and to which none of the pixels of the second group of pixels is to be shifted; and a second selecting unit 320 for selecting a particular one of the second group of pixels for computing a third one of the output pixels situated in the empty area.

The working and the advantage of this establishing and selection are explained in connection with FIG. 2.

Alternatively, the rendering unit 305 also comprises the determining unit 309 as explained in connection with FIG. 3B.

Alternatively, the rendering unit 305 also comprises the overlap establishing unit 314 and the first selecting unit 316 as explained in connection with FIG. 3C.

The shift computing unit 302, the interpolation unit 304, the determining unit 309, the overlap establishing unit 314, the first selecting unit 316, the empty area establishing unit 318 and the second selecting unit 320 may be implemented using one processor.

FIG. 4 schematically shows an embodiment of a multi-view image generation unit 400 comprising an embodiment of the rendering unit 402 according to the invention as described in connection with any of the FIGS. 3A-3D. The multi-view image generation unit 400 is arranged to generate a sequence of multi-view images on basis of a sequence of video images. The multi-view image generation unit 400 is provided with a stream of video images at the input connector 406 and provides two correlated streams of video images at the output connectors 412 and 414, respectively. These two correlated streams of video images are to be provided to a multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3-D impression. It might be that the first one of the correlated streams of video images corresponds to the sequence of video images as received and that the second one of the correlated streams of video images is rendered according to the method of the invention on basis of the sequence of video images as received. Preferably, both streams of video images are rendered according to the method of the invention on basis of the sequence of video images as received.

The multi-view image generation unit 400 further comprises a first input connector 408 for providing depth related data elements and a second input connector 410 for providing information related to overlay/non-overlay preferably in the form of an overlap indicator map.

It should be noted that, although the multi-view image generation unit 400 is designed to deal with video images, alternative embodiments of the multi-view image generation unit 400 are arranged to generate a multi-view image on basis of individual images, i.e. still pictures.

It should be noted that, although the depicted multi-view image generation unit 400 has two output connectors 412 and 414, alternative ways of outputting are possible, e.g. interleaved output which is ready for display on a multi-view display device. Besides that, the number of output images forming the different multi-view images is certainly not limited to the number of two.

FIG. 5 schematically shows an embodiment of the image processing apparatus 500 according to the invention, comprising:

a receiving unit 502 for receiving a video signal representing input images and depth related data;

a multi-view image generation unit 400 for generating multi-view images on basis of the received input images and the corresponding depth related data elements, as described in connection with FIG. 4; and a multi-view display device 506 for displaying the multi-view images as provided by the multi-view image generation unit 400.

The video signal may be a broadcast signal received via an antenna or cable but may also be a signal from a storage device like a VCR (Video Cassette Recorder) or Digital Versatile Disk (DVD). The signal is provided at the input connector 510. The image processing apparatus 500 might e.g. be a TV. Alternatively the image processing apparatus 500 does not comprise the optional display device but provides the output images to an apparatus that does comprise a display device 506. Then the image processing apparatus 500 might be e.g. a set top box, a satellite-tuner, a VCR player, a DVD player or recorder. Optionally the image processing apparatus 500 comprises storage means, like a hard disk or means for storage on removable media, e.g. optical disks. The image processing apparatus 500 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A rendering unit implemented via a processor for rendering an output image comprising output pixels, on basis of an input image comprising input pixels and on basis of depth related data elements corresponding to the respective input pixels, the rendering unit comprising:

a shift computing unit for computing shift values to be applied to the input pixels, on basis of the respective depth related data elements; and an interpolation unit for computing the output pixels on basis of shifting the input pixels with the respective shift values, wherein the shift computing unit is configured to provide an output value as the first one of the shift values, which is substantially equal to zero if the corresponding first one of the input pixels corresponds to overlay, independent of the corresponding depth related data element, further comprising:

an input interface for indicating a first group of pixels of the input pixels which correspond to overlay and a second group of pixels of the input pixels which correspond to non-overlay, the first group of pixels and the second group of pixels forming the input image;

an empty area establishing unit for establishing, on basis of a further portion of the depth related data elements, whether there is an empty area in the output image to which none of the pixels of the first group of pixels is to be mapped and to which none of the pixels of the second group of pixels is to be shifted; and a selecting unit for selecting a particular one of the second group of pixels for computing a third one of the output pixels situated in the empty area, whereby the selecting unit is configured to select the particular one of the second group of pixels in the environment of the empty area.

2. The rendering unit as claimed in claim 1, wherein said rendering unit further comprises:

a determining unit for determining a first group of pixels of the input pixels which correspond to overlay and a second group of pixels of the input pixels which correspond to non-overlay.

3. The rendering unit as claimed in claim 1, wherein said rendering unit further comprises:

an overlap establishing unit for establishing, on basis of a portion of the depth related data elements', whether there is an overlap area in the output pixels of the output image to which (i) a first one of the first group of pixels is to be mapped and (ii) a first one of the second group of pixels is to be shifted; and a selecting unit for selecting the first one of the first group of pixels for computing a second one of the output values of the output pixels situated in the overlap area.

4. An image processing apparatus comprising:

receiving means for receiving a signal corresponding to an input image; and a rendering unit for rendering output values of output pixels of an output image, as claimed in claim 1.

5. The image processing apparatus as claimed in claim 4, wherein said image processing apparatus further comprises:

a display device for displaying the output image.

6. A non-transitory computer-readable storage medium encoded with a computer program to be loaded on a computer arrangement, said computer program comprising instructions for causing the computer arrangement to render output values of output pixels of an output image, (i) on basis of input pixels of an input image and (ii) on basis of depth related data elements corresponding to the respective input pixels, the computer arrangement comprising processing means, an input interface and a memory, the computer program product, after being loaded, providing said processing means with the capability to carry out:

computing shift values to be applied to the input pixels, on basis of the respective depth related data elements;

computing the output pixels on basis of shifting the input pixels with the respective shift values, wherein the input pixels are categorized into two groups of pixels in which a first group of pixels represent overlay information and a second group of pixels represent non-overlay information, further wherein computing shift values results into an output value of a corresponding output pixel as a first one of the shift values, which is substantially equal to zero if the corresponding first one of the input pixels corresponds to overlay, independent of the corresponding depth related data element;

receiving, via the input interface, an indication of a first group of pixels of the input pixels which correspond to overlay and a second group of pixels of the input pixels which correspond to non-overlay, the first group of pixels and the second group of pixels forming the input image;

establishing, on basis of a further portion of the depth related data elements, whether there is an empty area in the output image to which none of the pixels of the first group of pixels is to be mapped and to which none of the pixels of the second group of pixels is to be shifted; and selecting a particular one of the second group of pixels for computing a third one of the output pixels situated in the empty area, whereby the computer arrangement is configured to select the particular one of the second group of pixels in the environment of the empty area.

7. A method implemented via a processor of rendering output values of output pixels of an output image, (i) on basis of input pixels of an input image and (ii) on basis of depth related data elements corresponding to the respective input pixels, the method comprising:

computing shift values to be applied to the input pixels, on basis of the respective depth related data elements;

computing the output values of the output pixels on basis of shifting the input pixels with the respective shift values, wherein the input pixels are categorized into two groups of pixels in which a first group of pixels represent overlay information and a second group of pixels represent non-overlay information, further wherein computing shift values results into an output value of a corresponding output pixel as a first one of the shift values, which is substantially equal to zero if the corresponding first one of the input pixels corresponds to overlay, independent of the corresponding depth related data element;

receiving an indication of a first group of pixels of the input pixels which correspond to overlay and a second group of pixels of the input pixels which correspond to non-overlay, the first group of pixels and the second group of pixels forming the input image;

establishing, on basis of a further portion of the depth related data elements, whether there is an empty area in the output image to which none of the pixels of the first group of pixels is to be mapped and to which none of the pixels of the second group of pixels is to be shifted; and selecting a particular one of the second group of pixels for computing a third one of the output pixels situated in the empty area, whereby the computer arrangement is configured to select the particular one of the second group of pixels in the environment of the empty area.

* * * * *